(12) United States Patent
Dormody et al.

(10) Patent No.: US 10,288,424 B2
(45) Date of Patent: May 14, 2019

(54) SYSTEMS AND METHODS FOR IMPROVING AN ESTIMATE OF RECEIVER ALTITUDE BY MITIGATING THE EFFECTS OF TRANSMITTER HEATING

(71) Applicant: NextNav, LLC, Sunnyvale, CA (US)

(72) Inventors: Michael Dormody, San Jose, CA (US); Thomas Wolf, Mountain View, CA (US); Arun Raghupathy, Bangalore (IN); Andrew Sendonaris, Los Gatos, CA (US)

(73) Assignee: NextNav, LLC, Sunnyvale, CA (US)

( * ) Notice: Subject to any disclaimer, the term of this patent is extended or adjusted under 35 U.S.C. 154(b) by 129 days.

(21) Appl. No.: 15/466,704

(22) Filed: Mar. 22, 2017

(65) Prior Publication Data

US 2017/0195984 A1    Jul. 6, 2017

Related U.S. Application Data

(60) Provisional application No. 62/382,503, filed on Sep. 1, 2016.

(51) Int. Cl.
*G01C 5/06* (2006.01)
*H04W 64/00* (2009.01)

(52) U.S. Cl.
CPC .............. *G01C 5/06* (2013.01); *H04W 64/00* (2013.01)

(58) Field of Classification Search
CPC .............. G01C 5/00; G01C 5/06; G01C 25/00
USPC .................................. 73/384, 385, 386, 387
See application file for complete search history.

(56) References Cited

U.S. PATENT DOCUMENTS

| 2012/0182180 A1 | 7/2012 | Wolf et al. |
| 2014/0200846 A1* | 7/2014 | Wachter ................... G01C 5/06 702/138 |

\* cited by examiner

*Primary Examiner* — Benjamin R Schmitt
(74) *Attorney, Agent, or Firm* — Kyle Pendergrass

(57) ABSTRACT

Improving an estimated altitude of a receiver by mitigating the effects of transmitter heating. Systems and methods for improving estimates of a receiver's altitude determine a reference pressure at a reference altitude using a temperature measured at a transmitter or another temperature value, an altitude of the transmitter, and a pressure measured by the transmitter or another pressure value. A local reference pressure for a receiver is determined using the reference pressure and other reference pressures from other transmitters. Reference pressures from overheating transmitters may be weighted less than reference pressures from other transmitters when determining the local reference pressure. The local reference pressure is then used to estimate the altitude of the receiver.

29 Claims, 13 Drawing Sheets

US 10,288,424 B2

SYSTEMS AND METHODS FOR IMPROVING AN ESTIMATE OF RECEIVER ALTITUDE BY MITIGATING THE EFFECTS OF TRANSMITTER HEATING

BACKGROUND

Determining the exact location of a receiver (e.g., a mobile phone) in an environment can be quite challenging, especially when the receiver is located in an urban environment, or is located within a building. In particular, imprecise estimates of the receiver's altitude may have "life or death" consequences for the user. An imprecise estimate of a receiver's altitude can delay emergency personnel response times. In less dire situations, imprecise estimates of the receiver's altitude can negatively impact navigation applications by sending a user to the wrong floor of a building.

An estimate of a receiver's altitude can be determined using a pressure measured at the receiver and a normalized reference pressure ("reference pressure") corresponding to a reference altitude, among other inputs, as is known in the art. The reference pressure can be determined using pressure and temperature measurements collected from sensors at a transmitter in the service area of the receiver. Unfortunately, the accuracy of the estimated altitude can be negatively impacted by heating of the transmitter, such that temperature measurements made at the transmitter diverge from the true ambient temperature in the vicinity of the transmitter.

Thus, solutions are needed to improve an estimated altitude of a receiver by mitigating the effects of transmitter heating. Different systems and methods for improving an estimated altitude of a receiver by mitigating the effects of transmitter heating are described in the disclosure that follows.

DETAILED DESCRIPTION

An estimate of a receiver's altitude can be determined using a pressure measured at the receiver and an estimated normalized reference pressure ("reference pressure") corresponding to a reference altitude (e.g., ref_alt). Since the estimated reference pressure is typically determined using a temperature measurement collected from a reference sensor (also referred to as a "sensor") of a transmitter in the service area of the receiver (as well as other variables), an accurate estimate of the reference pressure requires the temperature measurement to accurately represent the ambient temperature at (e.g., in the vicinity of, within x units of measurement) the transmitter. Unfortunately, conditions in the transmitter's environment may cause a reference sensor of the transmitter to "overheat" or "overcool" such that its measurements of temperature are hotter or cooler relative to actual temperate. As a result, the estimated reference pressure will be negatively influenced by the inaccurate temperature measurement. Consequently, any generated estimate of the receiver's altitude using the estimated reference pressure will be inaccurate, where the inaccuracy increases as the difference in elevation between the receiver and the elevation of the reference sensor at the transmitter increases. Any deviation in the temperature measured at a transmitter from the true ambient temperature will result in a deviation in estimated altitude of a receiver from the true altitude of the receiver.

Systems and methods for improving an estimated altitude of a receiver by mitigating the effects of overheating or overcooling at the transmitter are described below. Attention is initially drawn to examples of systems that may be used.

Figure 1:
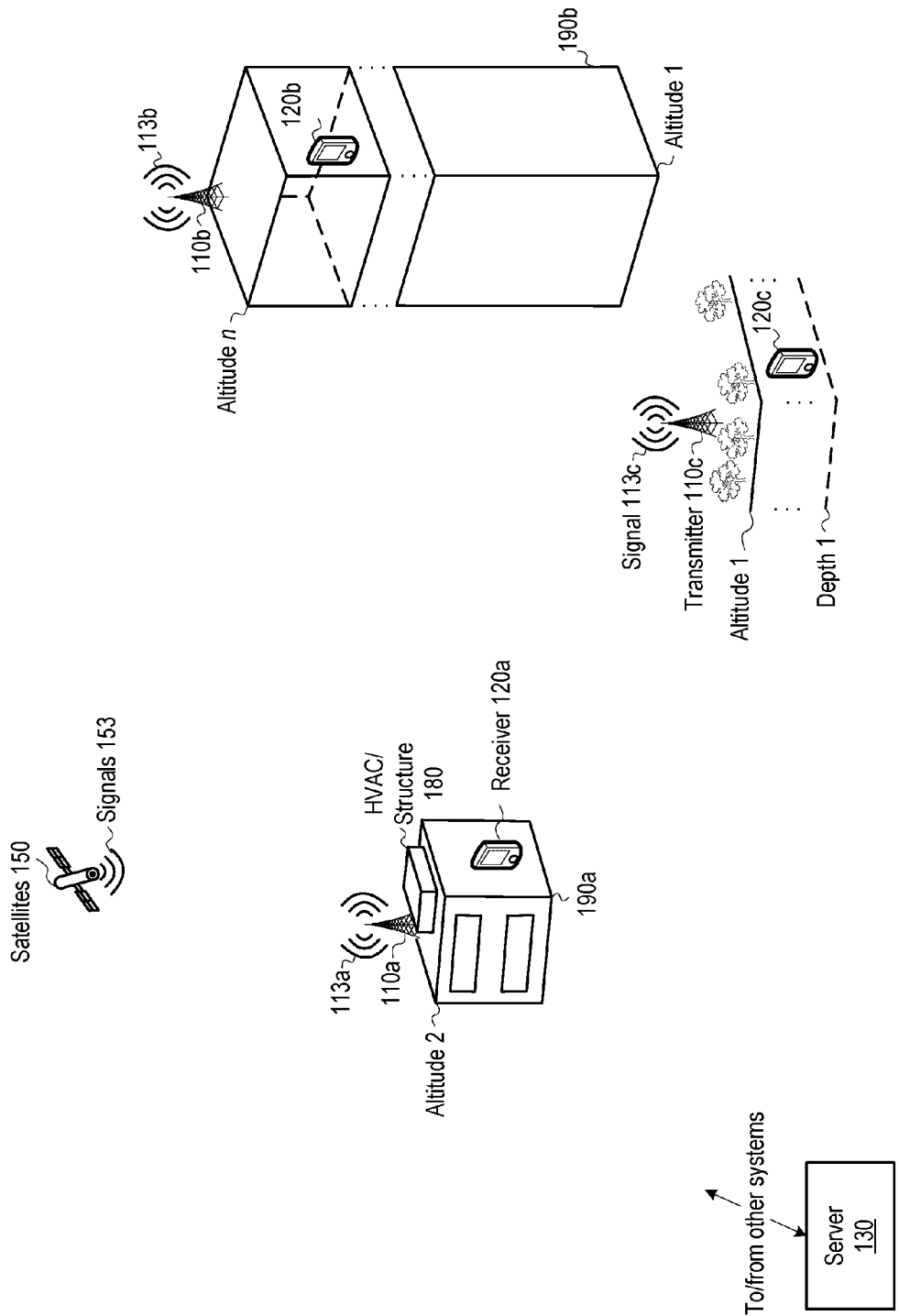
FIG. 1 depicts an operational environment for improving an estimated altitude of a receiver by mitigating the effects of transmitter heating.

An operational environment for improving an estimated altitude of a receiver by mitigating the effects of transmitter heating is depicted in FIG. 1. The operational environment contains a network of terrestrial transmitters 110 and any number of receivers 120 that are located at different altitudes or depths that are inside or outside various natural or manmade structures (e.g., buildings) 190. Signals 113 are exchanged between the receivers 120 and the transmitters 110. Signals 153 are exchanged between the receivers 120 and satellites 150. The signals 113 and 153 are transmitted using known wireless or wired transmission technologies. One or more of the signals 113 and 153 are used by a receiver 120 to generate an estimated position of the receiver 120, such as the latitude, longitude (LL) and optionally altitude (A) of the receiver 120. Additionally, a pressure measured at the receiver 120 and a reference pressure determined using a transmitter 110 in the service area of the receiver 120 are used to generate an estimated altitude of the receiver 120. By way of example, one or more of the transmitters 110 may include a highly-accurate, "gold-standard" reference sensor, a weather station, or another sensor known to produce measurements of atmospheric pressure and/or temperature to a desired level of accuracy. The gold-standard reference sensor is a sensor having one or more of the qualities of (1) producing measurements with low noise (e.g., noise below a preset threshold depending on the implementation), (2) producing measurements that are not significantly offset by sensor drift (e.g., are offset, if at all, by less than a preset threshold depending on the implementation), or (3) being located in an environment known to produce accurate measurements within its vicinity. Determining an estimated position of a receiver using received signals is well known in the art. Likewise, determining an estimate of a receiver's altitude using a measured pressure and a reference pressure is well known in the art (see, e.g., U.S. Patent Application Publication No. US 2012/0182180, published Jul. 19, 2012).

Figure 2:
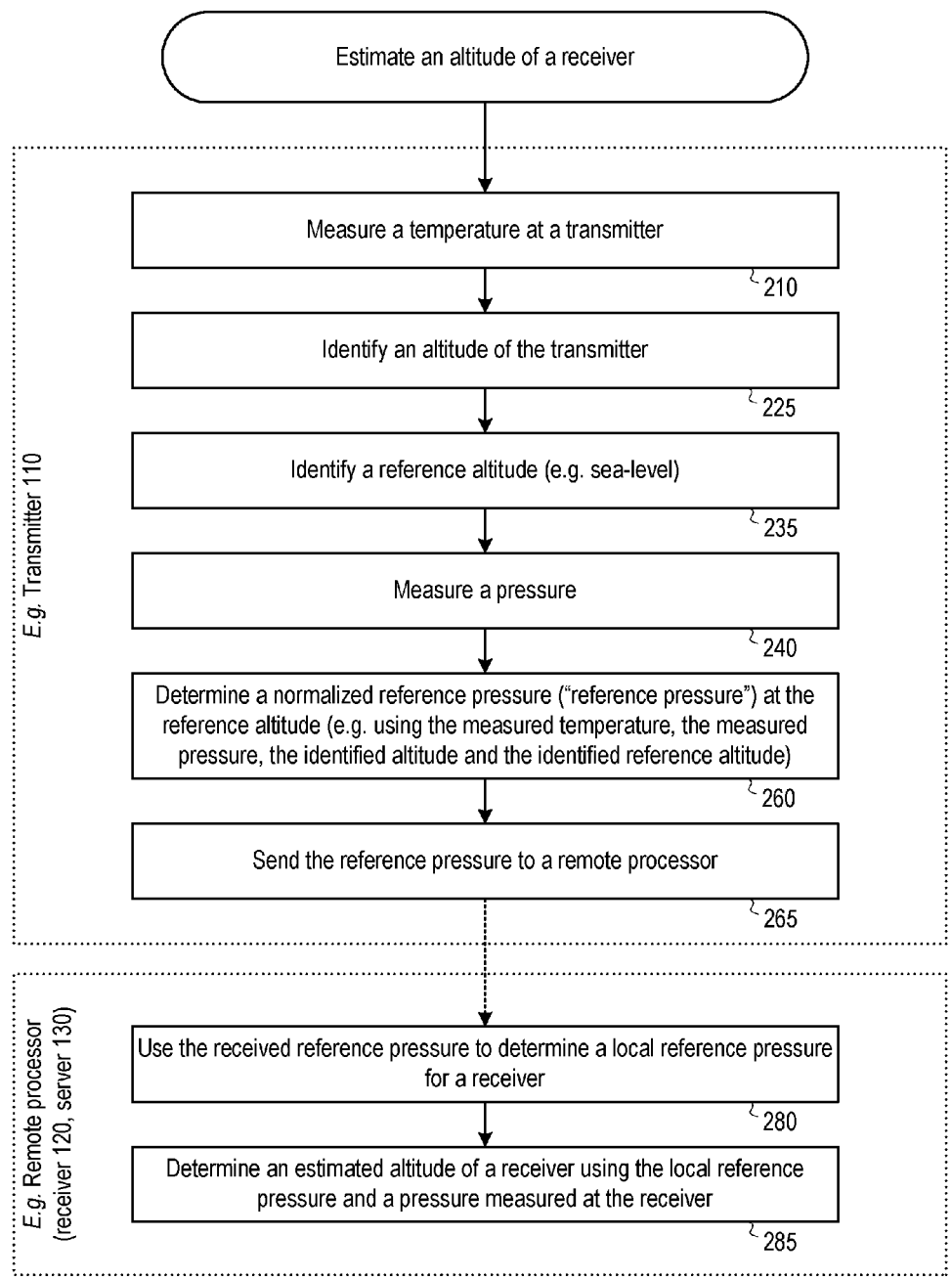
FIG. 2 shows a process for estimating the altitude of a receiver.

One process for estimating the altitude of a receiver is shown in FIG. 2. A temperature is measured at a transmitter during step 210, an altitude of the transmitter is identified during step 225 (e.g., by performing a database lookup of the altitude of the transmitter), a reference altitude is identified during step 235 (e.g., sea-level, 0m HAE, 0m MSL, or other), and a pressure at the transmitter is measured during step 240. Then, during step 260, a normalized reference pressure ("reference pressure") $P_{ref\_alt}$ at the reference altitude is determined (e.g., using the measured temperature, the measured pressure, the identified altitude, and the identified reference altitude). During step 265, the reference pressure $P_{ref\_alt}$ is sent to a remote processor (e.g., a processor of a receiver 120, a server 130 or other system located separate from the transmitter). The remote processor uses the received reference pressure to determine a local reference pressure in the vicinity of the receiver during step 280 (e.g., a reference pressure at the reference altitude, which is often below or above the true position of the receiver). The determined local reference pressure could be the received reference pressure $P_{ref\_alt}$ determined during step 260, a local reference pressure derived from weighted reference pressures for multiple transmitters, or another pressure (e.g., a pressure within a local environment shared with the true position of the receiver). During step 285, an estimate of a receiver's altitude is determined using the local reference pressure and a pressure measured at the receiver 120. As was previously discussed, determining an estimate of a receiver's altitude using a local measured pressure and a reference pressure is well known in the art.

In one embodiment, step 210 through step 265 are carried out at the transmitter, and step 280 through step 285 are carried out at the remote processor. Note that the steps of FIG. 2 need not occur in the illustrated order.

The following equation may be used to translate the pressure measured during step 240 to the reference pressure determined during step 260:

$$P_{ref\_alt} = P_{transmitter} \exp\left(\frac{gM(h_{site} - h_{ref\_alt})}{RT_{ambient}}\right) \quad \text{(Equation 1)}$$

where $P_{ref\_alt}$ corresponds to the determined reference pressure, $P_{transmitter}$ corresponds to the pressure measured during step 240, g corresponds to the acceleration due to gravity, M is the molar mass of dry air, $h_{site}$ is the transmitter altitude identified during step 225, $h_{ref\_alt}$ is the reference altitude identified during step 235, R is the universal gas constant and $T_{ambient}$ is the temperature measured during step 210.

As can be appreciated by Equation 1, an inaccurate temperature $T_{ambient}$ measured during step 210 will result in an inaccurate reference pressure $P_{ref\_alt}$ determined during step 260. Inaccurate temperature measurements can occur when transmitters overheat or overcool due to various factors. For example, a transmitter 110a in FIG. 1 is installed on top of a building 190a next to a HVAC/structure 180 that produces hot exhaust and/or blocks airflow to the transmitter 110a, which may cause a temperature measured at the transmitter 110a to not accurately represent the true ambient temperature in the vicinity of the transmitter 110a. Similarly, a transmitter 110b is installed on top of a building 190b, and is fully exposed to the sun, which may cause inaccurate temperature measurements as the transmitter 110b overheats due to sun exposure. By contrast, a transmitter 110c may not experience overheating since it is not near an HVAC/structure that causes overheating, and it is not fully exposed to the sun. Of course, overcooling is possible where the sensor is near something that decreases the localized temperature from true ambient temperature.

Figure 3:
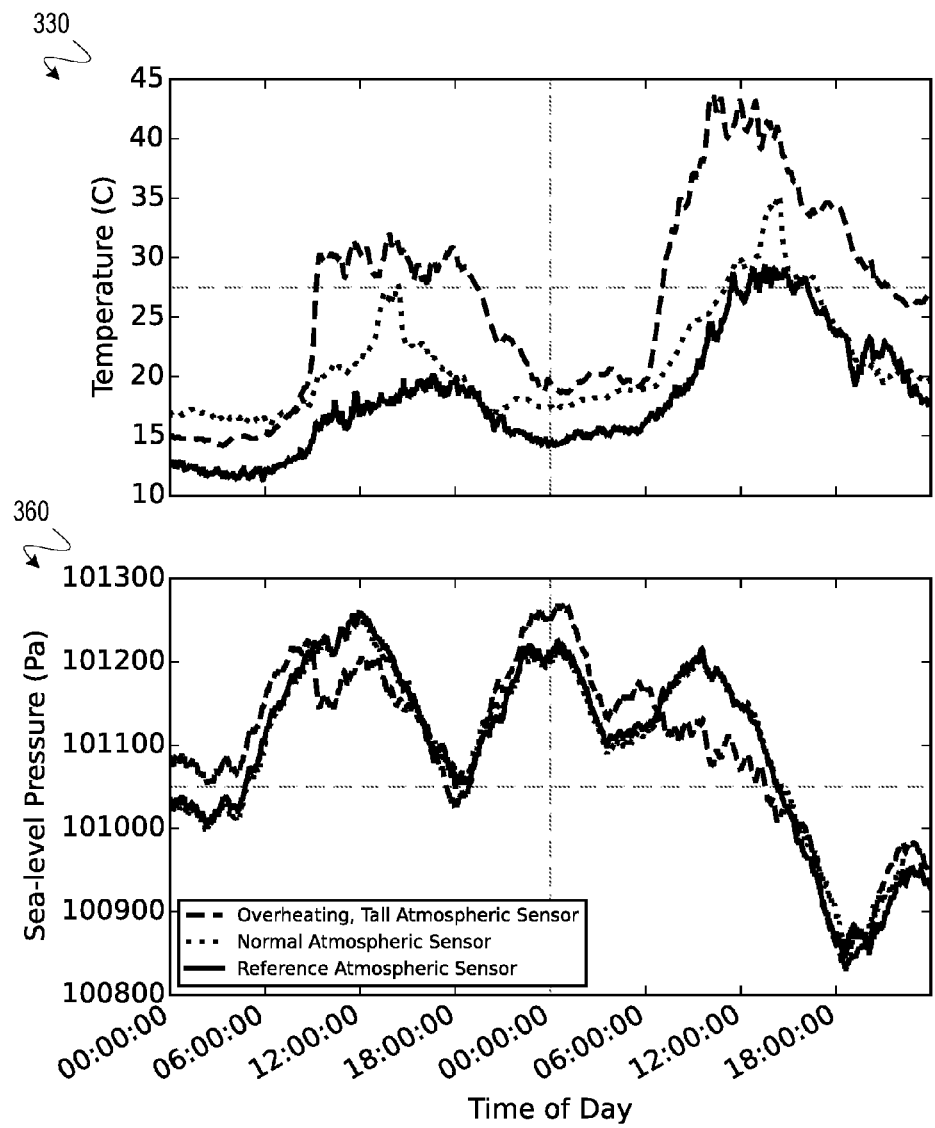
FIG. 3 illustrates the effects of transmitter heating on reference pressure estimation.

The effects of transmitter heating on reference pressure estimation is illustrated in FIG. 3. The dashed lines of plots 330 and 360 represent data associated with an overheating transmitter ("Overheating, Tall Atmospheric Sensor"). The dotted lines represent data associated with a nearby non-overheating transmitter ("Normal Atmospheric Sensor"), and the solid lines represent data associated with a nearby reference atmospheric sensor ("Reference Atmospheric Sensor"). The horizontal axes of plot 330 and of plot 360 represent the time of day spanning two days that each began at a cool temperature (12 degrees C.) and became subsequently hotter.

As shown in the top plot 330, temperatures measured at the overheating transmitter diverge considerably (peaking at around 43 degrees C.) from the temperatures measured at the nearby normal transmitter (peaking at around 35 degrees C.) and diverge further from the temperatures measured at the nearby reference atmospheric sensor (peaking at around 27 degrees C.).

Each temperature measured at the reference atmospheric sensor is associated with a pressure measurement that was measured at the reference atmospheric sensor at the same time. The values of each temperature measurement and of each pressure measurement measured at the reference transmitter are used with Equation 1 to determine a reference pressure corresponding to a reference altitude. The determined reference pressures of the reference atmospheric sensor are shown as a solid line in the bottom plot 360.

Likewise, each temperature measured at the normal atmospheric sensor is associated with a pressure measurement that was measured at the normal atmospheric sensor at the same time. The values of each temperature measurement and pressure measurement measured at the normal transmitter are used with Equation 1 to determine a reference pressure corresponding to a reference altitude. The determined reference pressures of the normal atmospheric sensor are shown as a dotted line in the bottom plot 360.

Additionally, each temperature measured at the overheating atmospheric sensor is associated with a pressure measurement that was measured at the overheating atmospheric sensor at the same time. The values of each temperature measurement and pressure measurement measured at the overheating transmitter are used with Equation 1 to determine a reference pressure corresponding to a reference altitude. The resultant reference pressures of the overheating atmospheric sensor are shown as a dashed line in the bottom plot 360.

As shown in the bottom plot 360, the reference pressure determined using data associated with the normal transmitter closely tracks the reference pressure determined using data associated with the reference atmospheric sensor. Conversely, when temperatures measured at the overheating atmospheric sensor diverge from the temperatures measured at the reference atmospheric sensor, the estimated reference pressure of the overheating atmospheric sensor diverges dramatically from the estimated reference pressure of the reference atmospheric sensor.

Solutions for mitigating the effects of transmitter heating on inaccurate estimates of reference pressures are discussed below.

Figure 4A:
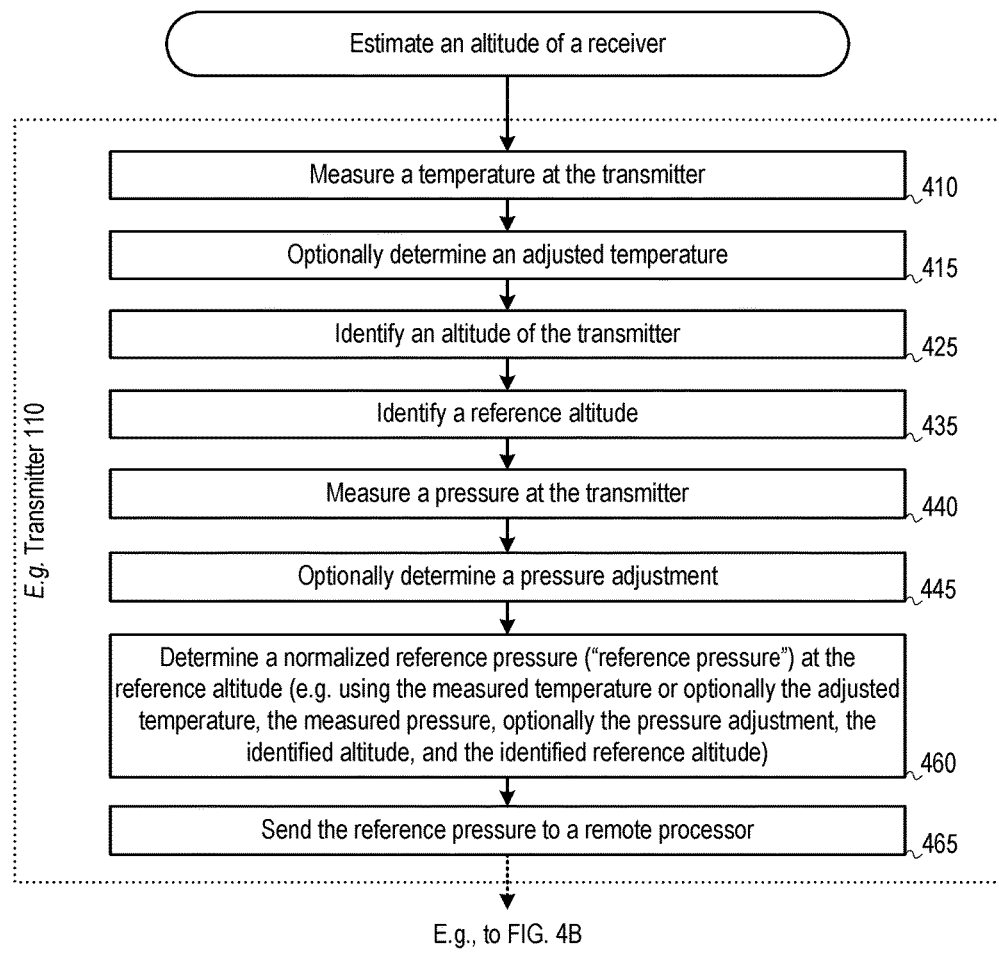
FIG. 4A and FIG. 4B show processes for improving an estimated altitude of a receiver by mitigating the effects of transmitter heating.

Improving an Estimated Altitude of a Receiver by Mitigating the Effects of Transmitter Heating A process for improving an estimated altitude of a receiver by mitigating the effects of transmitter heating is shown in FIG. 4A.

A temperature is measured at the transmitter during step 410, and an adjusted temperature is optionally determined during step 415. As discussed later, embodiments of step 415 may include sub-steps shown in FIG. 6 or FIG. 7 for mitigating the effects of transmitter heating.

An altitude of the transmitter is identified during step 425, a reference altitude is identified during step 435, and a pressure is measured at the transmitter during step 440. Then, during step 445, a pressure adjustment is optionally determined. As discussed later, one embodiment of step 445 may include sub-steps shown in FIG. 9A or FIG. 9B for mitigating the effects of transmitter heating.

During step 460, a normalized reference pressure ("reference pressure") is determined at the reference altitude—e.g., using the measured temperature or optionally the adjusted temperature, the measured pressure, optionally the pressure adjustment, the identified altitude, and the identified reference altitude. The determined reference pressure is sent to a remote processor during step 465.

In one embodiment, step 410 through step 465 occur at a transmitter.

Figure 4B:
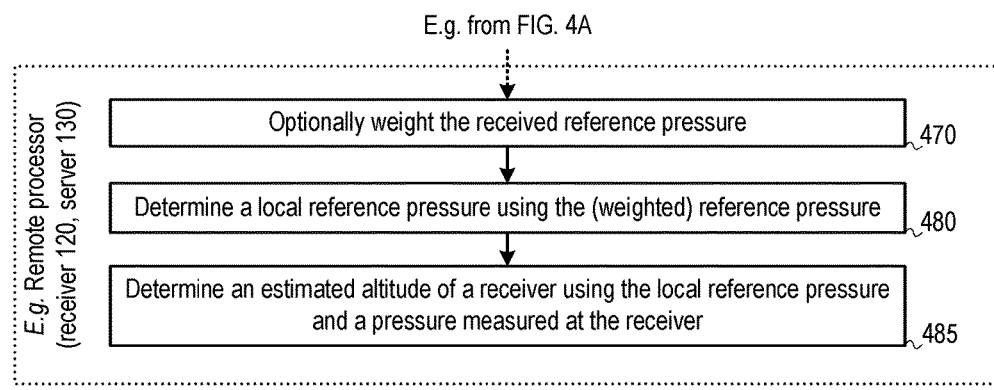

A process for improving an estimated altitude of a receiver by mitigating the effects of transmitter heating is shown in FIG. 4B.

The received reference pressure is optionally weighted during step 470. Details of weighting the received reference pressure is discussed later with respect to FIG. 13.

The optionally weighted reference pressure is used to determine a local reference pressure during step 480. Then, an estimate of a receiver's altitude is determined using the local reference pressure and a pressure measured by the receiver 120 during step 485.

In one embodiment, step 470 through step 485 occur at a receiver.

Each step of FIG. 4A and FIG. 4B need not be performed in each embodiment—e.g., in one embodiment, step 415 is not performed and the reference pressure is computed using the measured temperature; e.g., in another embodiment, step 445 is not performed and the reference pressure is computed without using a pressure adjustment; e.g., in yet another embodiment, step 470 is not performed and the local reference pressure is determined using the unweighted reference pressure; and other embodiments with any combination of not performing steps 415, 445 and 470 so long as at least one of steps 415, 445 and 470 is performed. Where step(s) are not performed in an embodiment, the system performing that embodiment does not need to be capable of performing the unperformed step(s).

Figure 5A:
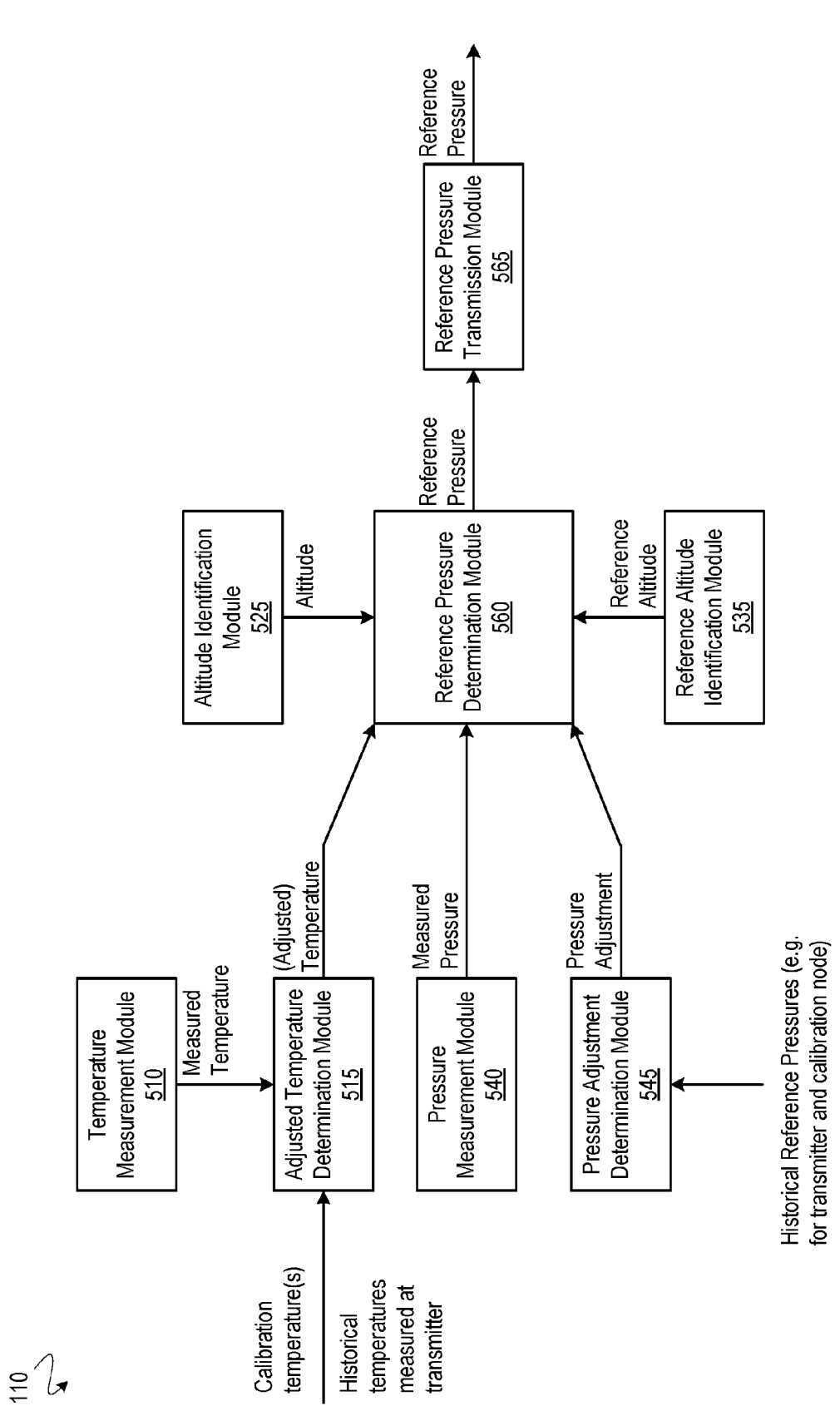
FIG. 5A illustrates one embodiment of a transmitter for improving an estimated altitude of a receiver by mitigating the effects of transmitter heating.

One embodiment of a transmitter 110 that improves an estimated altitude of a receiver 120 by mitigating the effects of transmitter heating is shown in FIG. 5A. The transmitter 110 is shown to include various modules that are each operable to carry out different steps of FIG. 4A. As shown, the modules may include: a temperature measurement module 510 operable to perform step 410; an adjusted temperature determination module 515 operable to perform step 415; a pressure measurement module 540 operable to perform step 440; a pressure adjustment determination module 545 operable to perform step 445; an altitude identification module 525 operable to perform step 425; a reference altitude identification module 535 operable to perform step 435; a reference pressure determination module 560 operable to perform step 460; and a reference pressure transmission module 565 operable to perform step 465.

As shown, the temperature measurement module 510 provides a measured temperature value to the adjusted temperature determination module 515. The reference pressure determination module 560 uses data it receives from the other modules to determine a reference pressure, and provides that reference pressure to the reference pressure transmission module 565, which transmits the reference pressure. The data may include a temperature value from the adjusted temperature determination module 515, a measured pressure value from the pressure measurement module 540, a pressure adjustment value from the pressure adjustment determination module 545, an altitude from the altitude identification module 525, and a reference altitude value from the reference altitude identification module 535.

In different embodiments discussed below, the adjusted temperature determination module 515 receives a calibration temperature value (e.g., a temperature from another source other than the transmitter 110), or receives values of historical temperatures measured at an earlier time and/or date at the transmitter 110.

In one embodiment discussed below, the pressure adjustment determination module 545 determines the pressure adjustment using one or more historical reference pressures that may correspond to measurements made at another transmitter or a calibration node (e.g., a "gold-standard" reference sensor).

Figure 5B:
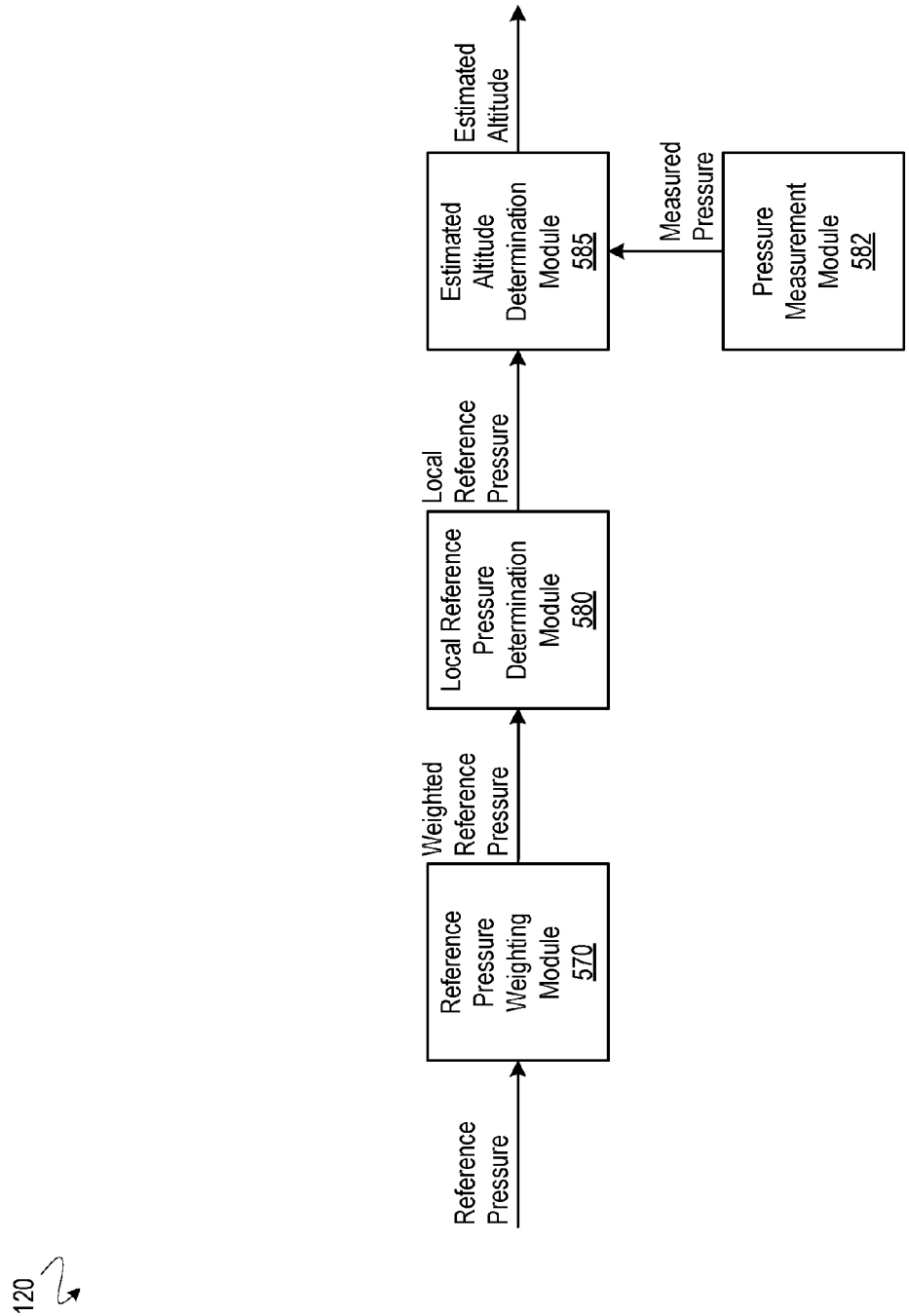
FIG. 5B illustrates one embodiment of a receiver for improving an estimated altitude of the receiver by mitigating the effects of transmitter heating.

One embodiment of a receiver 120 that improves an estimated altitude of the receiver 120 by mitigating the effects of transmitter heating is shown in FIG. 5B. The receiver 120 includes various modules that are each operable to carry out difference steps of FIG. 4B. As shown, the modules may include: a reference pressure weighting module 570 operable to perform step 470; a local reference pressure determination module 580 operable to perform step 480; and a pressure measurement module 582 and an estimated altitude determination module 585 that are collectively operable to perform step 485.

As shown, the reference pressure weighting module 570 is operable to receive one or more reference pressures, use those reference pressure(s) to determine a weighted reference pressure, and then send the weighted reference pressure to the local reference pressure determination module 580. The local reference pressure determination module 580 is operable to receive the weighted reference pressure, use the weighted reference pressure to determine a local reference pressure, and then send the local reference pressure to the estimated altitude determination module 585. The estimated altitude determination module 585 is operable to receive the local reference pressure, receive a measured pressure from the pressure measurement module 582, determine an estimated altitude using the local reference pressure and the measured pressure, and then provide the estimated altitude for various known uses.

Adjusting Temperature

As was shown in FIG. 3, temperature measurements that diverge from the true ambient temperature (e.g., at an overheating transmitter) may result in an inaccurate reference pressure determined using that temperature measurement. An adjusted temperature may be determined during step 415 of FIG. 4A to more accurately reflect true ambient temperature in the case where a temperature measurement originates from an overheating transmitter. Different approaches may be used for determining an adjusted temperature, including the processes shown in FIG. 6 or FIG. 7, which may be used to replace or adjust a temperature measurement associated with a transmitter such that a reference pressure determined using the adjusted temperature is more accurate than a reference pressure determined using an unadjusted temperature.

Figure 6:
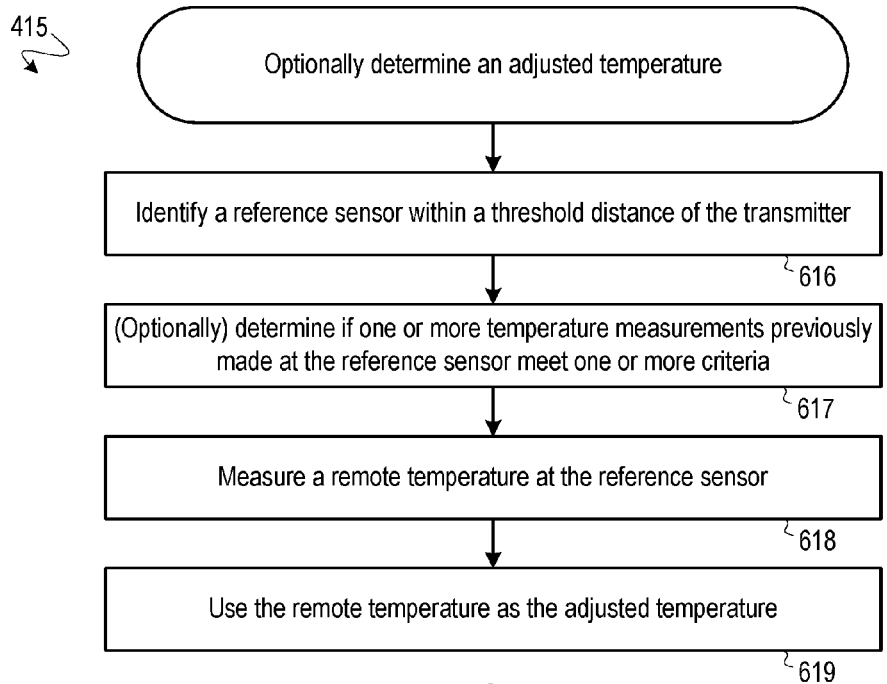
FIG. 6 shows a process for determining an adjusted temperature using a temperature measured at a remote sensor.

A process for determining an adjusted temperature using a temperature measured at a remote sensor is shown in FIG. 6. As shown, a reference sensor that is within a threshold distance of the transmitter is identified during step 616. The reference sensor could be another transmitter, a "gold-standard" reference sensor, a weather station, or other sensor. The threshold distance may be defined by a preset distance, a rule that the reference sensor is the closest reference sensor to the transmitter, or another consideration. An optional determination is made as to whether one or more temperature measurements previously made at the reference sensor meet one or more criteria during step 617—e.g., temperatures made at the reference sensor do not deviate beyond a threshold amount from a "gold-standard" temperature reference. A temperature is measured at the reference sensor during step 618, and the remote temperature is used as the adjusted temperature during step 619—e.g., the adjusted temperature can be used in place of $T_{ambient}$ in Equation 1.

In some embodiments, it is known a priori if a particular reference sensor is a "gold standard" reference sensor based on known characteristics of the reference sensor and/or knowledge of how and where the reference sensor was installed.

Figure 10:
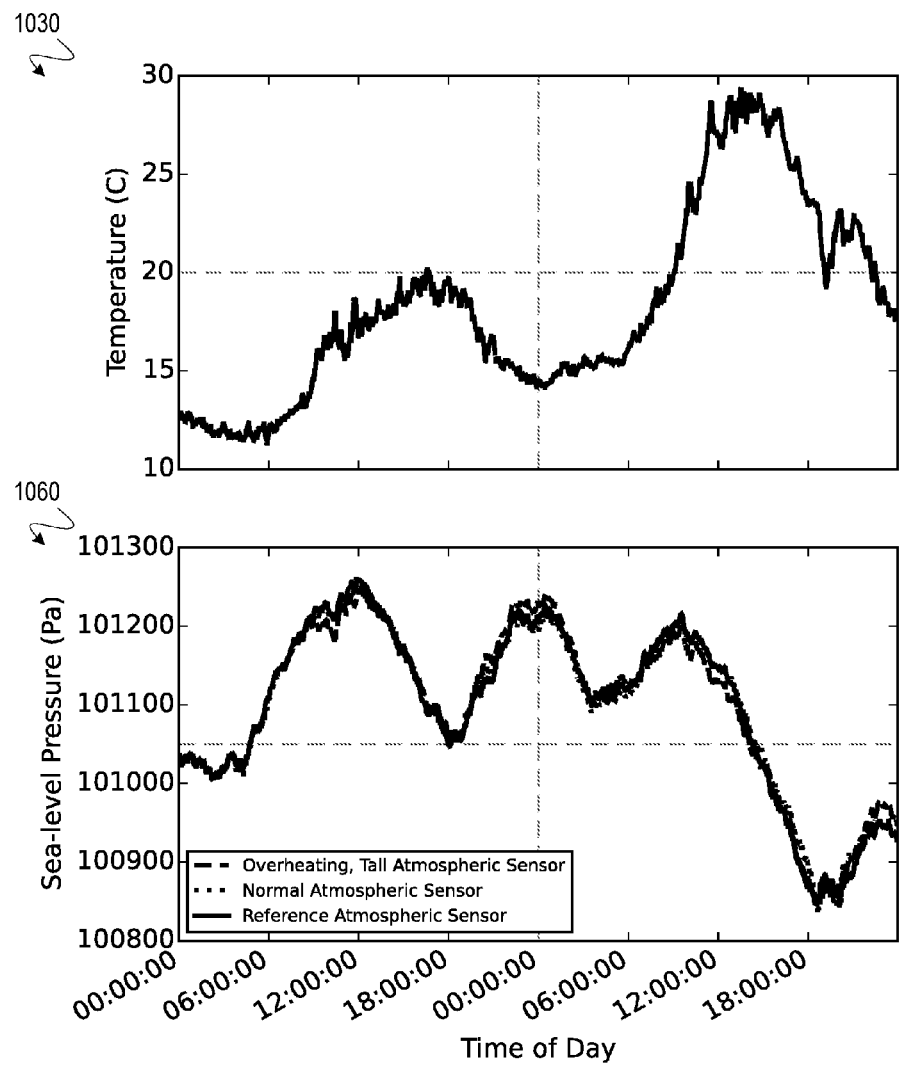
FIG. 10 illustrates the effects of transmitter heating on reference pressure estimation when the effects are mitigated using a temperature measured at a remote sensor.

The effects of transmitter heating on reference pressure estimation when the effects are mitigated using a temperature measured at a remote sensor are illustrated in FIG. 10. The dashed lines of a top plot 1030 and a bottom plot 1060 represent data associated with an overheating transmitter ("Overheating, Tall Atmospheric Sensor") that has been adjusted using the steps depicted in FIG. 6. The dotted lines represent data associated with a nearby non-overheating transmitter ("Normal Atmospheric Sensor") that has been adjusted using the steps depicted in FIG. 6. The solid lines represent data associated with a nearby reference atmospheric sensor ("Reference Atmospheric Sensor"). The horizontal axes of the top plot 1030 and of the bottom plot 1060 represent the time of day spanning two days that each began at a cool temperature (12 degrees C.) and became subsequently hotter.

As shown in the top plot 1030, adjusted temperature measurements of the overheating transmitter and of the normal transmitter shown in the top plot 1030 show less divergence from the temperature measurements of the reference atmospheric sensor compared to divergence shown in FIG. 3. Likewise, as shown in the bottom plot 1060, reference pressures determined using the adjusted temperature measurements of the overheating transmitter and of the normal transmitter show less divergence from the reference pressure determined using temperature measurement of the reference atmospheric sensor compared to divergence shown in FIG. 3.

Figure 7:
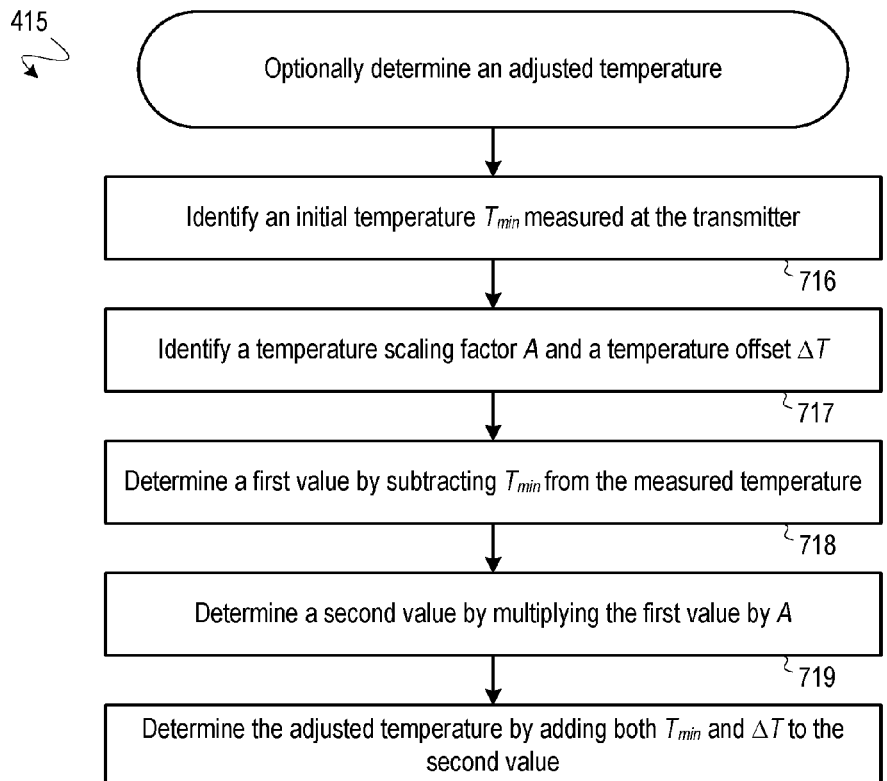
FIG. 7 shows a process for determining an adjusted temperature using a temperature scaling factor and a temperature offset value.

A process for determining an adjusted temperature using a temperature scaling factor and a temperature offset value is shown in FIG. 7.

An initial temperature measurement $T_{min}$, measured at the transmitter is identified during step 716. Details of step 716 are discussed later with reference to FIG. 8A.

A temperature scaling factor A and a temperature offset $\Delta T$ are identified during step 717. Details of step 717 are discussed later with reference to FIG. 8B.

A first value is determined by subtracting $T_{min}$ from the measured temperature $T_{measured}$ during step 718. A second value is determined by multiplying the first value by A during step 719. Then, during step 720, the adjusted temperature $T_{adjusted}$ is determined by adding both $T_{min}$ and $\Delta T$ to the second value. Step 718 through step 720 can be written as the following equation, $$T_{adjusted}=A(T_{measured}-T_{min})+T_{min}+\Delta T \qquad \text{(Equation 2)}$$

and the adjusted temperature $T_{adjusted}$ can be used in place of $T_{ambient}$ in Equation 1.

Figure 8A:
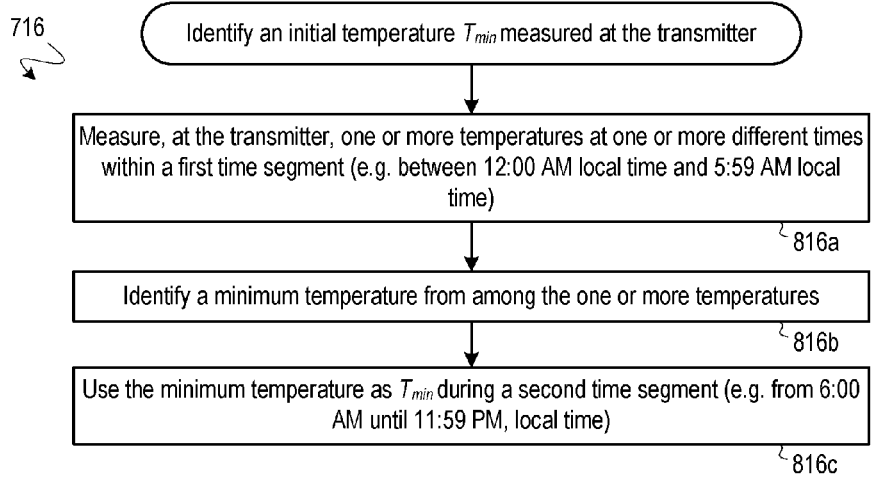
FIG. 8A shows a process for identifying an initial temperature measured at a transmitter.

A process for identifying an initial temperature measured at a transmitter during step 716 is shown in FIG. 8A. One or more temperatures are measured at the transmitter at one or more different times within a first time segment (e.g., between 12:00 AM local time and 5:59 AM local time) during step 816a. A minimum temperature is identified from among the one or more temperatures during step 816b. Then, the minimum temperature is used as $T_{min}$ during a second time segment (e.g., from 6:00 AM until 11:59 PM, local time) during step 816c.

Figure 8B:
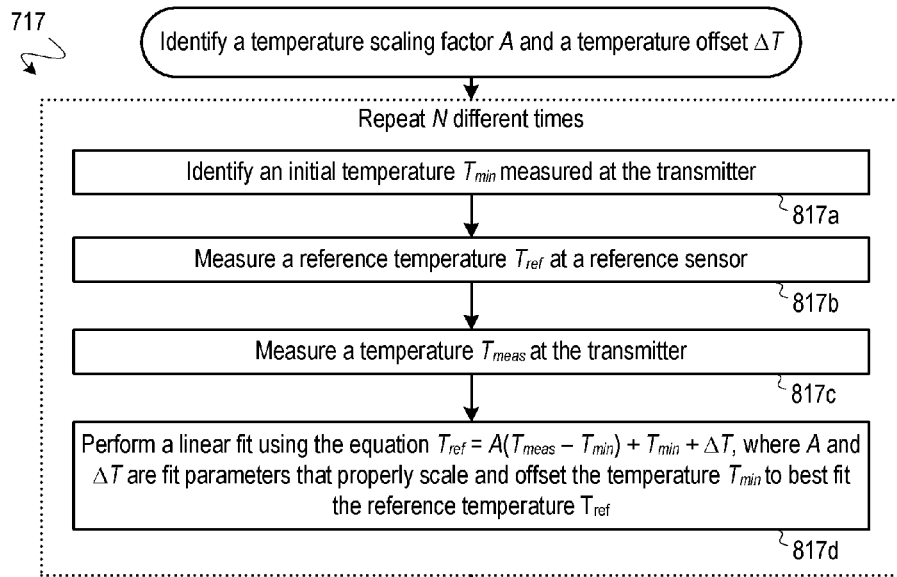
FIG. 8B shows a process for identifying a temperature scaling factor and a temperature offset value.
Figure 8B:
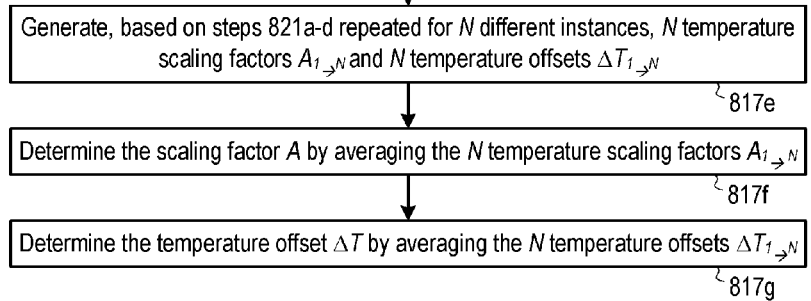

A process for identifying a temperature scaling factor and a temperature offset value during step 717 is shown in FIG. 8B. An initial temperature $T_{min}$ measured at the transmitter is identified during step 817a. A reference temperature $T_{ref}$ is measured at a reference sensor during step 817b. A temperature $T_{meas}$ is measured at the transmitter during step 817c. Then, a linear fit is performed using the following equation during step 817d:

$$T_{ref}=A(T_{meas}-T_{min})+T_{min}+\Delta T \qquad \text{(Equation 3)}$$

where A and $\Delta T$ are fit parameters that properly scale and offset the temperature $T_{min}$ to best fit the reference temperature $T_{ref}$. During step 817e, N temperature scaling factors $A_{1-N}$ and N temperature offsets $\Delta T_{1-N}$ are generated using step 817a through step 817d repeated for N different instances. The scaling factor A is determined by averaging the N temperature scaling factors $A_{1-N}$ during step 817f. Then, the temperature offset $\Delta T$ is determined by averaging the N temperature offsets $\Delta T_{1-N}$ during step 817g.

Figure 11:
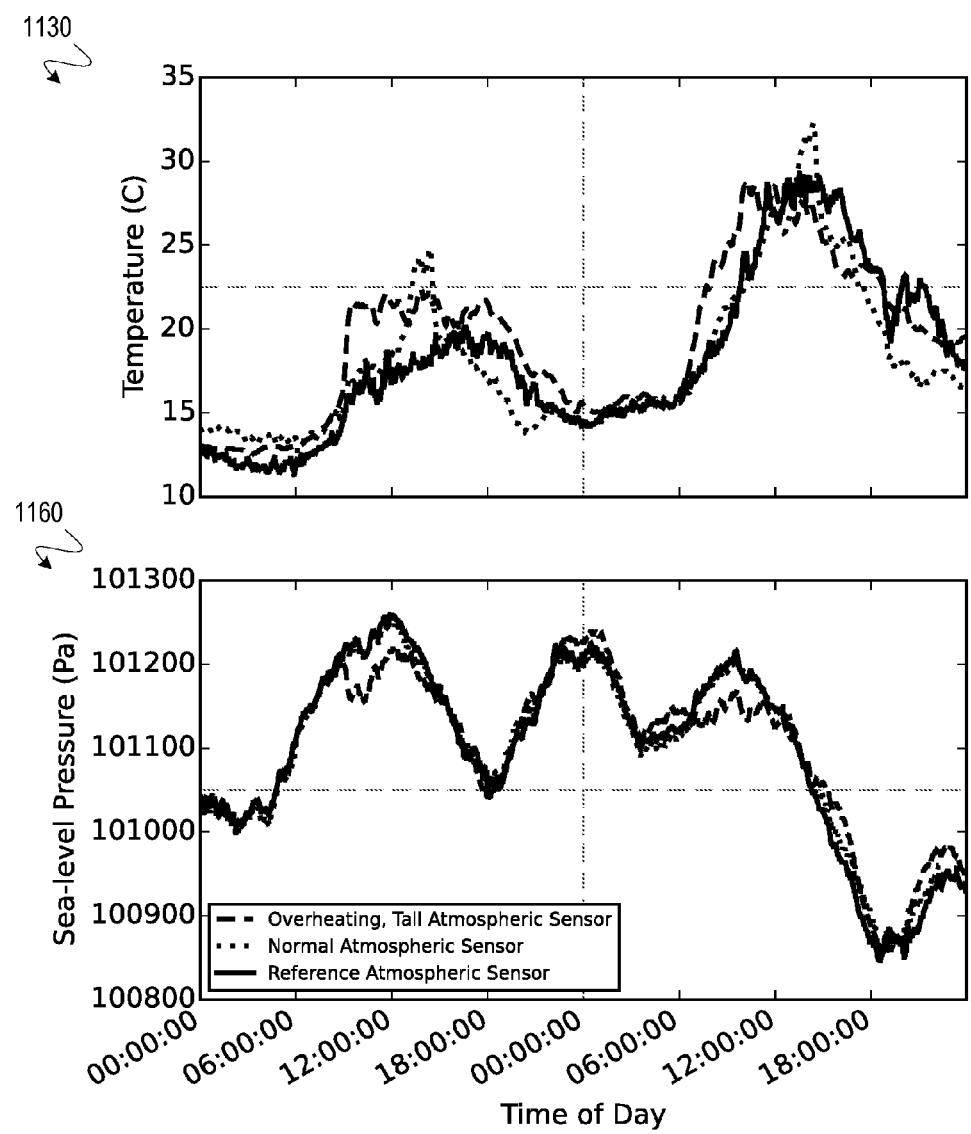
FIG. 11 illustrates the effects of transmitter heating on reference pressure estimation when the effects are mitigated using an adjusted temperature and an offset pressure.

The effects of transmitter heating on reference pressure estimation when the effects are mitigated using an adjusted temperature are illustrated in FIG. 11. The dashed lines of a top plot 1130 and a bottom plot 1160 represent data associated with an overheating transmitter ("Overheating, Tall Atmospheric Sensor") that has been adjusted using the steps depicted in FIG. 7. The dotted lines represent data associated with a nearby non-overheating transmitter ("Normal Atmospheric Sensor") that has been adjusted using the steps depicted in FIG. 7. The solid lines represent data associated with a nearby reference atmospheric sensor ("Reference Atmospheric Sensor"). The horizontal axes of the top plot 1130 and of the bottom plot 1160 represent the time of day spanning two days that each began at a cool temperature (12 degrees C.) and became subsequently hotter.

As shown in the top plot 1130, adjusted temperature measurements of the overheating transmitter and of the normal transmitter shown in the top plot 1130 diverge significantly less from the temperature measurements of the reference atmospheric sensor than the un-adjusted temperature measurements depicted in the top plot 330 of FIG. 3. Likewise, as shown in the bottom plot 1160, reference pressures of the overheating transmitter and of the normal transmitter diverge significantly less from the reference sensor's reference pressures than those depicted in the bottom plot 360 of FIG. 3.

Adjusting Pressure

A pressure adjustment value ΔP may be applied to the determined reference pressure in certain approaches for mitigating the effects of transmitter heating. By way of example, the equation below—a combination of Equation 1 and Equation 2—illustrates the use of a temperature adjustment (from Equation 2) to determine an intermediate reference pressure. The intermediate reference pressure is then adjusted by a pressure adjustment value ΔP to determine the reference pressure $P_{ref\_alt}$.

$$P_{ref\_alt} = P_{site} \exp\left(\frac{gM(h_{site} - h_{ref\_alt})}{R(A(T_{measured} - T_{min}) + T_{min} + \Delta T))}\right) + \Delta P. \quad \text{(Equation 4)}$$

Of course, the temperature adjustment from Equation 2 does not need to be used to determine an intermediate reference pressure.

Figure 9A:
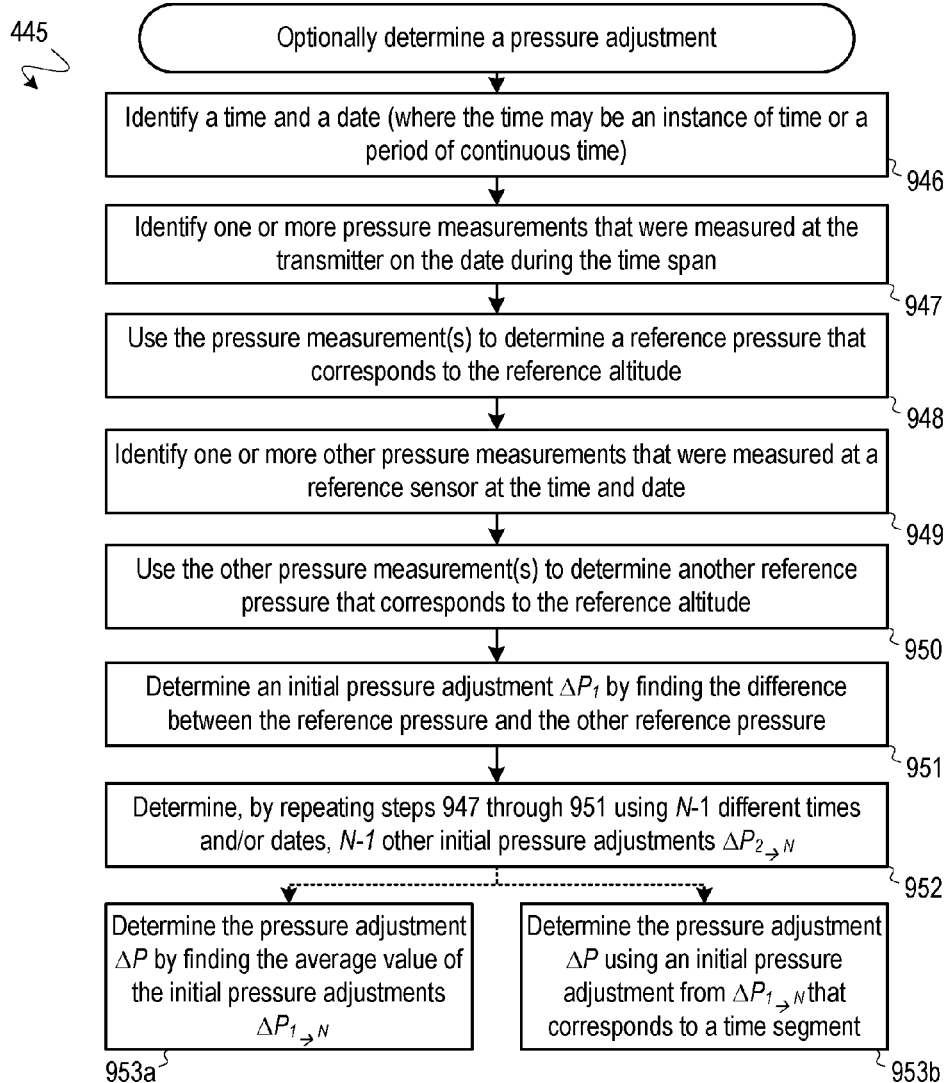
FIG. 9A shows a process for determining a pressure adjustment.

A process for determining a pressure adjustment is shown in FIG. 9A. The steps of the process include: identifying a time and date (step 946), where the time may be an instance of time or a period of continuous time (e.g., a time span from 10:00 AM local time to 10:30 AM local time); identifying one or more pressure measurements measured at the transmitter at that time and date (step 947); using the pressure measurement(s) to determine a reference pressure that corresponds to the reference altitude (step 948); identifying one or more other pressure measurements that were measured at a reference sensor (e.g., at a "gold-standard" reference sensor) at the time and date (step 949); using the other pressure measurement to determine another reference pressure that corresponds to the reference altitude (step 950); determining an initial pressure adjustment $\Delta P_1$ by finding the difference between the reference pressure and the other reference pressure (e.g., of the gold-standard reference sensor) (step 951); determining, by repeating steps 947 through 951 using N−1 different time and/or dates, N−1 other initial pressure adjustments $\Delta P_{2\_N}$(step 952); and performing one of: determining the pressure adjustment ΔP by finding the average value of the initial pressure adjustments $\Delta P_{1\_N}$(step 953a), or determining the pressure adjustment ΔP using an initial pressure adjustment from $\Delta P_{1\_N}$ that corresponds to a particular time segment (step 953b). The reference sensor could be another transmitter, a "gold-standard" reference sensor, a weather station, or other sensor. Each ΔP associated with a time of day may be used during that particular time of day on that particular day, or at that particular time of day on a different day.

In one embodiment of step 953b, a time segment during which a pressure was measured at the transmitter is identified (e.g., a time and date). A historical reference pressure adjustment $\Delta P_n$ that was determined at a previous time or during the time segment on a previous day is identified, where the historical pressure adjustment is either the initial pressure adjustment (e.g., $\Delta P_1$ of step 951) or another initial pressure adjustment (e.g., and of $\Delta P_{2\_N}$ of step 952). The historical pressure adjustment is used as the pressure adjustment ΔP. The pressure adjustment value ΔP may be a historic pressure adjustment value ΔP that was determined on a different day.

Figure 9B:
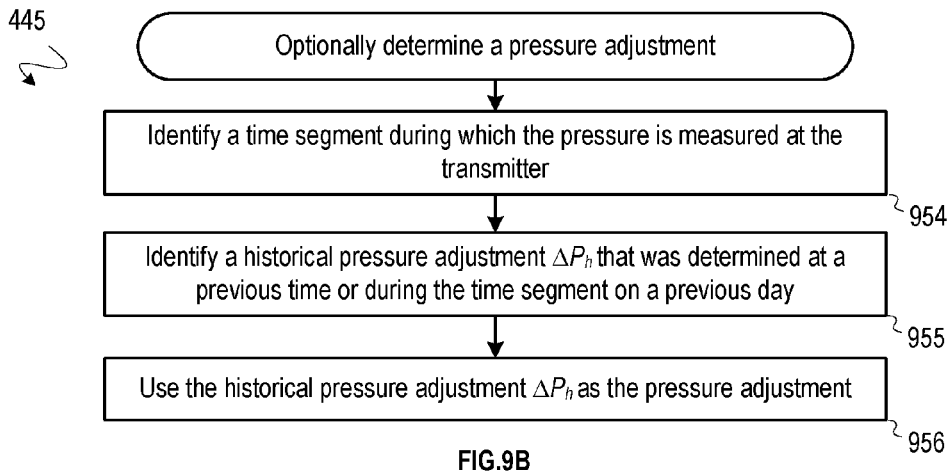
FIG. 9B shows a process for determining a pressure adjustment corresponding to a time segment.

A process for determining a pressure adjustment corresponding to a time segment in shown in FIG. 9B. A time segment during which the pressure is measured at the transmitter is identified during step 954. A historical pressure adjustment $\Delta P_h$ that was determined at a previous time or during the time segment on a previous day is identified during step 955. Then, the historical pressure adjustment $\Delta P_h$ is used as the pressure adjustment during step 956.

Figure 12:
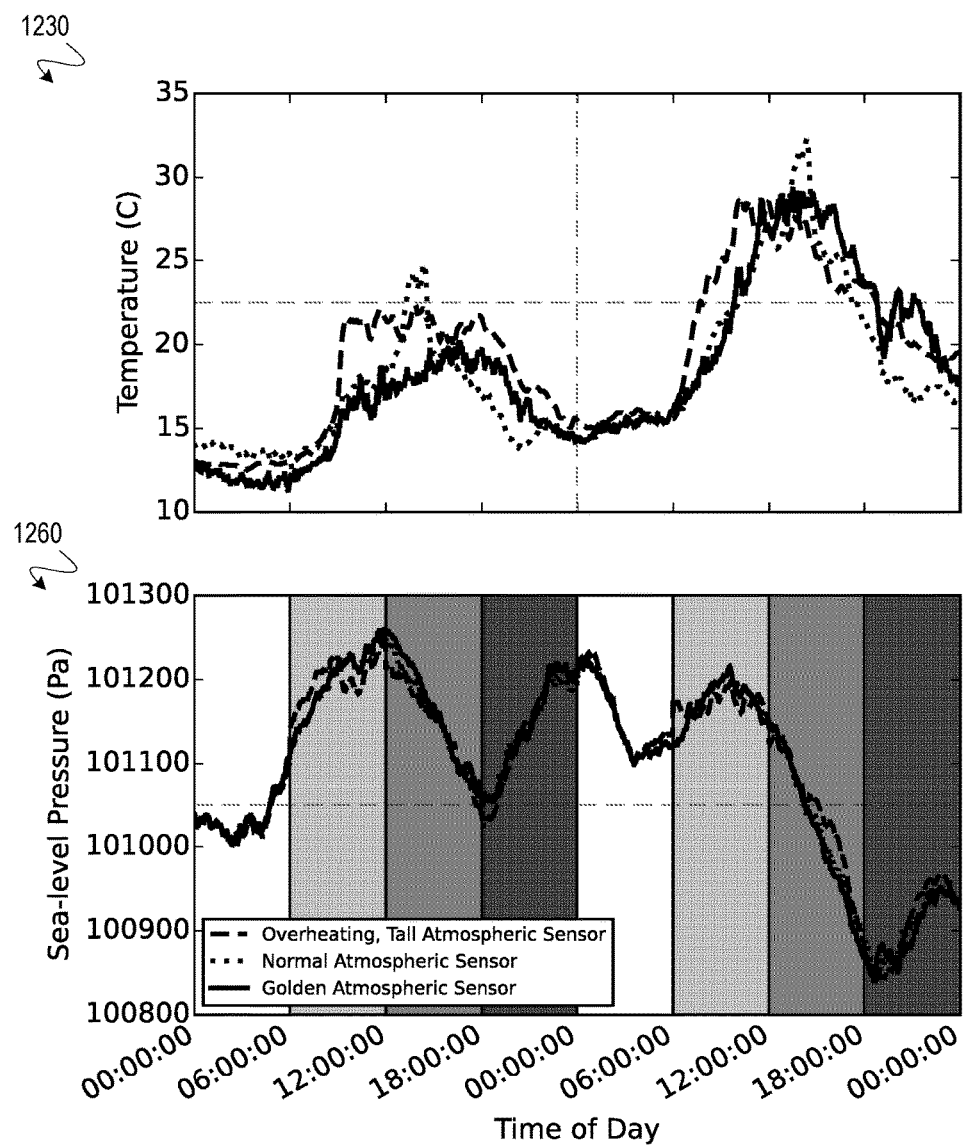
FIG. 12 illustrates the effects of transmitter heating on reference pressure estimation when the effects are mitigated using an adjusted temperature and an offset pressure corresponding to a time segment.

The effects of transmitter heating on reference pressure estimation when the effects are mitigated using an adjusted temperature and a pressure adjustment corresponding to a time segment are illustrated in FIG. 12. The dashed lines of a top plot 1230 and a bottom plot 1260 represent data associated with an overheating transmitter ("Overheating, Tall Atmospheric Sensor") that has been adjusted using the steps depicted in FIG. 7 and FIG. 9B. The dotted lines represent data associated with a nearby non-overheating transmitter ("Normal Atmospheric Sensor") that has been adjusted using the steps depicted in FIG. 7 and FIG. 9B. The solid lines represent data associated with a nearby reference atmospheric sensor ("Reference Atmospheric Sensor"). The horizontal axes of the top plot 1230 and of the bottom plot 1260 represent the time of day spanning two days that each began at a cool temperature (12 degrees C.) and became subsequently hotter. Different shaded bins represent time segments during the day (e.g., 6:00:00 through 11:59:59, 12:00:00 through 17:59:59, etc.). As was discussed with reference to FIG. 9B, historic pressure correction values $\Delta P_h$ associated with a particular time segment during the day may be used during the associated time segment and are not used during other time segments of the day.

As shown in the top plot 1230, adjusted temperature measurements of the overheating transmitter and of the normal transmitter diverge significantly less from the temperature measurements of the reference atmospheric sensor shown in the top plot 1230 than the un-adjusted temperature measurements depicted in the top plot 330 of FIG. 3. Likewise, as shown in the bottom plot 1260, reference pressures of the overheating transmitter and of the normal transmitter diverge significantly less from the reference sensor's reference pressures than those depicted in the bottom plot 360 of FIG. 3.

Weighting Reference Pressures from Different Transmitters

As mentioned above during the discussion of FIG. 4B, a reference pressure is optionally weighted before being used to determine a local reference pressure. The local reference pressure is then used with a local measured pressure to determine an estimated altitude of the receiver. Reference pressures that are strongly affected by erroneous temperature measurements can be weighted less than reference pressures that are not so strongly affected by erroneous temperature measurements. It may be important to do so since any deviation $\Delta T_{dev}$ in the temperature measured at a transmitter from the true ambient temperature $T_{ambient}$ will result in a deviation in estimated altitude Δh of a receiver from the true altitude $h_{actual}$ of the receiver, as illustrated by Equation 5 below:

$$\Delta h = \frac{h_{actual} \Delta T_{dev}}{T_{ambient}}. \quad \text{(Equation 5)}$$

As Equation 5 illustrates, even a small temperature error can give rise to an altitude error, especially for very tall buildings (e.g., having a height of 150 m above a plane on which a reference altitude is located).

Figure 13:
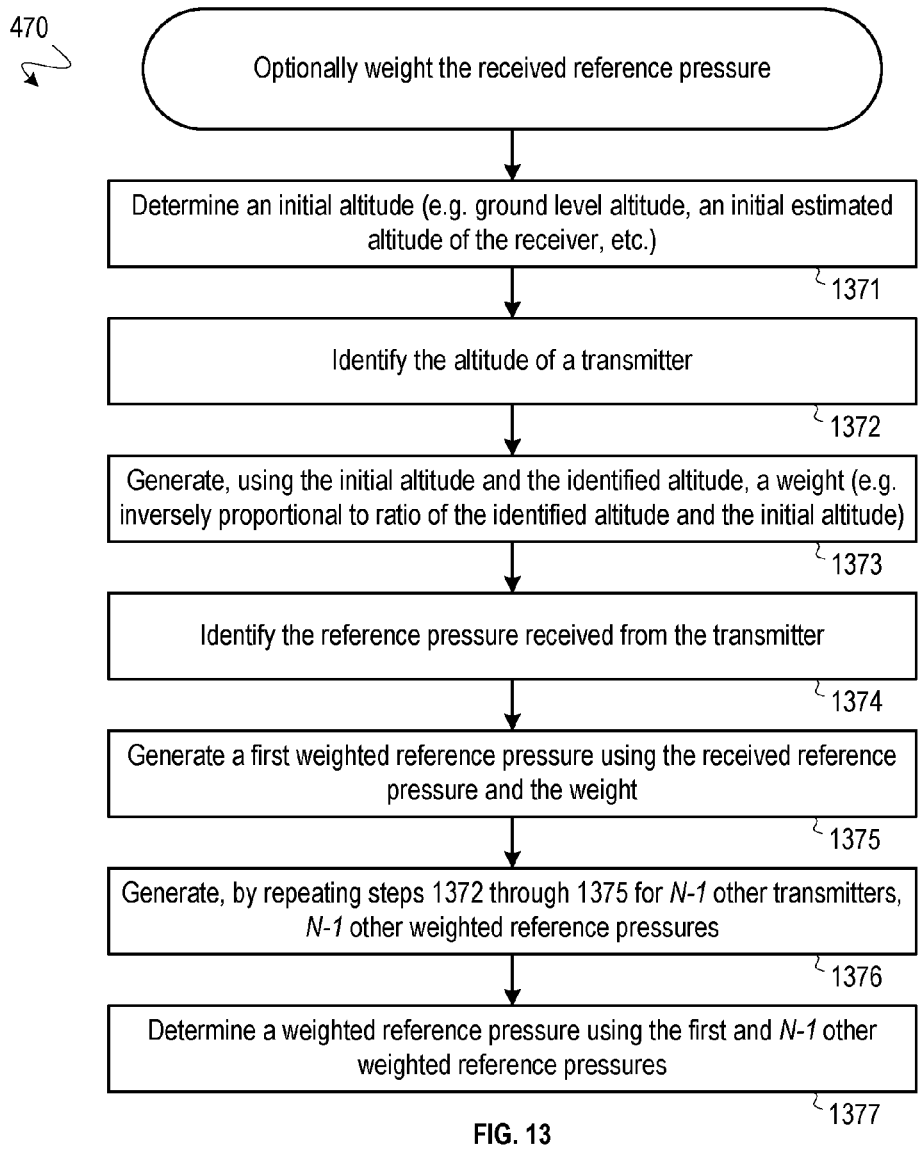
FIG. 13 shows a process for weighting a received reference pressure.

A process for weighting a received reference pressure is shown in FIG. 13. As shown, an initial altitude—e e.g., a ground level altitude, an initial estimated altitude of the receiver—is determined during step 1371. Then, during step 1372, the altitude of a transmitter is identified—e.g., using a database lookup. A weight is generated using the initial altitude and the identified altitude during step 1373. In one embodiment, the generated weight is inversely proportional to the ratio of the initial altitude and the identified altitude. A reference pressure from a transmitter is identified during step 1374. Then, during step 1375, a first weighted reference pressure is generated using the identified reference pressure and the weight (e.g., by multiplying the reference pressure and the weight). During step 1376, N−1 other weighted reference pressures are generated by repeating step 1372 through step 1375 for N−1 other transmitters. Finally, a weighted reference pressure is determined using the first weighted reference pressure and the N−1 other weighted reference pressure during step 1377, as illustrated in Equation 6 below:

$$P_{ref\_alt} = \frac{w_1 P^1_{ref\_alt} + w_2 P^2_{ref\_alt} + \ldots + w_N P^N_{ref\_alt}}{w_1 + w_2 + \ldots + w_N} \quad \text{(Equation 6)}$$

where $P_{ref\_alt}$ is the weighted reference pressure, $w_1$ through $w_N$ are the N generated weights, and $P_{ref\_alt}^1$ through $P_{ref\_alt}^N$ are the N reference pressures determined using N different transmitters.

In one embodiment, each of the generated weights is a functional form of the vertical distance $z_n$ between the receiver (e.g., an initial estimate of the receiver's location) and each transmitter, the weight being larger for transmitters that are closer in elevation to the receiver. In one embodiment, the weight is the inverse of the vertical distance (e.g., $1/z_n$), or the square root of the inverse of the vertical distance (e.g., $1/\sqrt{z_n}$). Singularities at $z_n=0$ could be avoided in numerous ways (e.g., $1/(1+z_i)$, $1/(1+\sqrt{z_i})$). In another embodiment a weight is determined using only the height of the sensor above ground level, assuming the worst-case of the user being at ground level. In another embodiment, each of the weights is inversely proportional to the three-dimensional distance between the receiver and the sensor, or are inversely proportional to the combination of the line-of sight (LOS) distance and a vertical distance between the receiver and the pressure sensor. That is, measurements made at sensors that are closer to the receiver receive a higher weight than measurements made at sensors that are farther from the receiver.

Effect of Overheating of Pressure Sensor Calibration

The reference pressure $P_{ref\_alt}$ of Equation 1 may be further adjusted by a calibration value that is determined using a highly accurate reference sensor. Barometric pressure sensors, such as those which may be used at the transmitters 110, are known to drift. To counter the effects of drifting, each transmitter's barometric pressure sensor may be periodically recalibrated using a calibration value. In one embodiment, a reference pressure $P_{ref\_alt}$ is determined using a drifting sensor of a transmitter 110. A calibration value is determined by comparing the reference pressure $P_{ref\_alt}$ to a reference pressure associated with a nearby highly-accurate reference sensor. The calibration value is then set to the difference between the two reference pressures, and the calibration value is applied to future reference pressures $P_{ref\_alt\_future}$. Atmospheric sensors at overheating transmitters can generate inaccurate normalized pressures (e.g., sea level pressure). Referring back to Equation 1, if the temperature $T_{ambient}$ measured during step 210 deviates from the true ambient temperature due to localized transmitter heating, $T_{ambient}$ becomes $T_{ambient}'$ and the reference pressure $P_{sea-level}$ is affected.

Other Aspects

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems; RF front end module(s) with circuitry components that are known or disclosed herein); processing module(s) for performing signal processing (e.g., generating signals for transmission at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other); and/or interface module(s) for exchanging information with other systems via other links other than a radio link. Signals transmitted by a transmitter may carry different information that, once determined by a receiver or a server, may identify the following: the transmitter; the transmitter's location (LLA); pressure, temperature, humidity, and/or other conditions at or near the transmitter.

A receiver may be in the form of a computing device (e.g., a mobile phone, tablet, laptop, digital camera, tracking tag), and may include any of: antenna module(s) for exchanging signals with other systems; RF front end module(s) with circuitry components that are known or disclosed herein; processing module(s) for signal processing of received signals to determine position information (e.g., times of arrival or travel time of received signals, atmospheric information from transmitters, and/or location or other information associated with each transmitter), for using the position information to compute an estimated position of the receiver, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver (e.g., pressure, temperature, humidity, wind, other), which may be compared to the same environmental conditions at or near transmitters to determine the altitude of the receiver; other sensor module(s) for measuring other conditions (e.g., acceleration, velocity, orientation, light, sound); interface module(s) for exchanging information with other systems via other links other than a radio link;

and/or input/output module(s) for permitting a user to interact with the receiver. Processing by the receiver can also occur at a server.

It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

RELATED APPLICATIONS

This application relates to the following related application(s): U.S. Pat. Appl. No. 62/382,503, filed 1 Sep. 2016, entitled SYSTEMS AND METHODS FOR IMPROVING AN ESTIMATE OF RECEIVER ALTITUDE BY MITIGATING THE EFFECTS OF TRANSMITTER HEATING. The content of each of the related application(s) is hereby incorporated by reference herein in its entirety.

The invention claimed is:

1. A method for improving estimates of an altitude of a receiver by mitigating the effects of transmitter heating, the method comprising:
   determining a measured temperature at a transmitter;
   determining an adjusted temperature by:
   (i) identifying an initial temperature measured at the transmitter;
   (ii) identifying a temperature scaling factor and a temperature offset;
   (iii) determining a first value by subtracting the initial temperature from the measured temperature;
   (iv) determining a second value by multiplying the first value by the temperature scaling factor; and
   (v) determining the adjusted temperature by adding both the initial temperature and the temperature offset to the second value;
   identifying an altitude of the transmitter;
   identifying a reference altitude;
   determining a measured pressure;
   determining a reference pressure at the reference altitude using the adjusted temperature;
   determining a local reference pressure for the receiver using the reference pressure; and
   determining an estimated altitude of the receiver using (i) the local reference pressure and (ii) a measurement of pressure measured at the receiver.

2. The method of claim 1, the method comprising:
   generating a weight using the altitude of the transmitter and a second altitude; and
   weighting the reference pressure with the weight,
   wherein the local reference pressure is determined using the weighted reference pressure.

3. The method of claim 2, wherein the second altitude is an initial estimated altitude of the receiver, and wherein the weight is inversely proportional to a ratio of the altitude of the transmitter and the second altitude.

4. The method of claim 1, wherein identifying an initial temperature measured at the transmitter comprises:
   measuring, at the transmitter, one or more temperatures at one or more different times within a first time segment;
   identifying a minimum temperature from among the one or more temperatures; and
   using the minimum temperature as the initial temperature.

5. The method of claim 1, wherein identifying a temperature scaling factor and a temperature offset comprises:
   measuring a reference temperature at a reference sensor;
   determining another temperature measured at the transmitter;

determining a first temperature scaling factor and a first temperature offset using the initial temperature, the reference temperature and the other temperature measured at the transmitter;

determining the temperature scaling factor using the first temperature scaling factor; and determining the temperature offset using the first temperature offset.

6. The method of claim 5, wherein the first temperature scaling factor and the first temperature offset are determined using a linear fit, and wherein the first temperature scaling factor and the first temperature offset are fit parameters that scale and offset the initial temperature to fit the reference temperature.

7. The method of claim 5, wherein determining the temperature scaling factor using the first temperature scaling factor and determining the temperature offset using the first temperature offset comprises:

identifying a second initial temperature measured at a second transmitter;

measuring a second reference temperature at either the reference sensor or a second reference sensor;

determining an additional temperature measured at the second transmitter;

determining a second temperature scaling factor and a second temperature offset using the second initial temperature, the second reference temperature, and the additional temperature measured at the second transmitter;

determining the temperature scaling factor by combining the first temperature scaling factor and the second temperature scaling factor; and determining the temperature offset by combining the first temperature offset and the second temperature offset.

8. The method of claim 1, wherein the method comprises:

determining a pressure adjustment by:
(i) identifying a first time and a first date,
(ii) identifying a first pressure measurement that was measured at the transmitter during the first time and the first date,
(iii) using the first pressure measurement to determine a first reference pressure that corresponds to the reference altitude,
(iv) identifying a second pressure measurement that was measured at a reference sensor during the first time and the first date,
(v) using the second pressure measurement to determine a second reference pressure that corresponds to the reference altitude,
(vi) determining an initial pressure adjustment by determining a difference between the first reference pressure and the second reference pressure, and
(vii) determining the pressure adjustment using the initial pressure adjustment; and using the pressure adjustment and the measured pressure to determine the reference pressure.

9. The method of claim 8, wherein determining the pressure adjustment using the initial pressure adjustment comprises:

identifying a second time and second date, wherein the second time is different than the first time, the second date is different than the first date, or both the second time is different than the first time and the second date is different than the first date;

identifying a third pressure measurement that was measured at the transmitter during the second time and the second date;

using the third pressure measurement to determine a third reference pressure that corresponds to the reference altitude;

identifying a fourth pressure measurement that was measured at the reference sensor during the second time and the second date;

using the fourth pressure measurement to determine a fourth reference pressure that corresponds to the reference altitude;

determining another initial pressure adjustment by determining a difference between the third reference pressure and the fourth reference pressure; and determining the pressure adjustment using one or both of the initial pressure adjustment and the other initial pressure adjustment.

10. The method of claim 9, wherein determining the pressure adjustment using one or both of the initial pressure adjustment and the other initial pressure adjustment comprises:

combining the initial pressure adjustment and the other initial pressure adjustment.

11. The method of claim 9, wherein determining the pressure adjustment using one or both of the initial pressure adjustment and the other initial pressure adjustment comprises:

identifying a time segment during which the measured pressure was measured at the transmitter;

identifying a historical pressure adjustment that was determined at a previous time before the time segment during which the pressure is measured at the transmitter or during the time segment on a previous day, wherein the historical pressure adjustment is either the initial pressure adjustment or the other initial pressure adjustment; and using the historical pressure adjustment as the pressure adjustment.

12. The method of claim 8, wherein using the pressure adjustment and the measured pressure to determine the reference pressure comprises:

determining an intermediate reference pressure using the measured pressure; and adjusting the intermediate reference pressure by the pressure adjustment to determine the reference pressure.

13. The method of claim 1, wherein:

identifying an initial temperature measured at the transmitter comprises:

measuring, at the transmitter, one or more temperatures at one or more different times within a first time segment, (ii) identifying a minimum temperature from among the one or more temperatures, and (iii) using the minimum temperature as the initial temperature; and identifying a temperature scaling factor and a temperature offset comprises:

(i) measuring a reference temperature at a reference sensor, (ii) determining another temperature measured at the transmitter, (iii) determining a first temperature scaling factor and a first temperature offset using the initial temperature, the reference temperature and the other temperature measured at the transmitter, (iv) determining the temperature scaling factor using the first temperature scaling factor, and
(v) determining the temperature offset using the first temperature offset.

14. The method of claim 1, wherein determining a reference pressure at the reference altitude using the adjusted temperature comprises:
determining a difference in altitude between the altitude of the transmitter and the reference altitude;
determining a third value by multiplying the difference in altitude, an acceleration due to gravity, and a molar mass of air;
determining a fourth value by multiplying a gas constant and the adjusted temperature;
determining a fifth value by dividing the third value by the fourth value; and
determining the reference pressure by multiplying the measured pressure by an exponential function of the fifth value.

15. A system for improving estimates of a receiver's altitude, wherein the system includes one or more modules that are operable to perform the method of claim 1.

16. One or more non-transitory machine-readable media embodying program instructions that, when executed by one or more machines, cause the one or more machines to implement a method for improving estimates of an altitude of a receiver by mitigating the effects of transmitter heating, the method comprising:
determining a measured temperature at a transmitter;
determining an adjusted temperature by:
(i) identifying an initial temperature measured at the transmitter;
(ii) identifying a temperature scaling factor and a temperature offset;
(iii) determining a first value by subtracting the initial temperature from the measured temperature;
(iv) determining a second value by multiplying the first value by the temperature scaling factor; and
(v) determining the adjusted temperature by adding both the initial temperature and the temperature offset to the second value;
identifying an altitude of the transmitter;
identifying a reference altitude;
determining a measured pressure;
determining a reference pressure at the reference altitude using the adjusted temperature;
determining a local reference pressure for the receiver using the reference pressure; and
determining an estimated altitude of the receiver using (i) the local reference pressure and (ii) a measurement of pressure measured at the receiver.

17. The one or more non-transitory machine-readable media of claim 16, the method comprising:
generating a weight using the altitude of the transmitter and a second altitude; and
weighting the reference pressure with the weight,
wherein the local reference pressure is determined using the weighted reference pressure.

18. The one or more non-transitory machine-readable media of claim 17, wherein the second altitude is an initial estimated altitude of the receiver, and wherein the weight is inversely proportional to a ratio of the altitude of the transmitter and the second altitude.

19. The one or more non-transitory machine-readable media of claim 16, wherein identifying an initial temperature measured at the transmitter comprises:
measuring, at the transmitter, one or more temperatures at one or more different times within a first time segment;
identifying a minimum temperature from among the one or more temperatures; and
using the minimum temperature as the initial temperature.

20. The one or more non-transitory machine-readable media of claim 16, wherein identifying a temperature scaling factor and a temperature offset comprises:
measuring a reference temperature at a reference sensor;
determining another temperature measured at the transmitter;
determining a first temperature scaling factor and a first temperature offset using the initial temperature, the reference temperature and the other temperature measured at the transmitter;
determining the temperature scaling factor using the first temperature scaling factor; and
determining the temperature offset using the first temperature offset.

21. The one or more non-transitory machine-readable media of claim 20,
wherein the first temperature scaling factor and the first temperature offset are determined using a linear fit, and
wherein the first temperature scaling factor and the first temperature offset are fit parameters that scale and offset the initial temperature to fit the reference temperature.

22. The one or more non-transitory machine-readable media of claim 20, wherein determining the temperature scaling factor using the first temperature scaling factor and determining the temperature offset using the first temperature offset comprises:
identifying a second initial temperature measured at a second transmitter;
measuring a second reference temperature at either the reference sensor or a second reference sensor;
determining an additional temperature measured at the second transmitter;
determining a second temperature scaling factor and a second temperature offset using the second initial temperature, the second reference temperature, and the additional temperature measured at the second transmitter;
determining the temperature scaling factor by combining the first temperature scaling factor and the second temperature scaling factor; and
determining the temperature offset by combining the first temperature offset and the second temperature offset.

23. The one or more non-transitory machine-readable media of claim 16, wherein the method comprises:
determining a pressure adjustment by:
(i) identifying a first time and a first date,
(ii) identifying a first pressure measurement that was measured at the transmitter during the first time and the first date,
(iii) using the first pressure measurement to determine a first reference pressure that corresponds to the reference altitude,
(iv) identifying a second pressure measurement that was measured at a reference sensor during the first time and the first date,
(v) using the second pressure measurement to determine a second reference pressure that corresponds to the reference altitude,
(vi) determining an initial pressure adjustment by determining a difference between the first reference pressure and the second reference pressure, and (vii) determining the pressure adjustment using the initial pressure adjustment; and using the pressure adjustment and the measured pressure to determine the reference pressure.

24. The one or more non-transitory machine-readable media of claim 23, wherein determining the pressure adjustment using the initial pressure adjustment comprises:

identifying a second time and second date, wherein the second time is different than the first time, the second date is different than the first date, or both the second time is different than the first time and the second date is different than the first date;

identifying a third pressure measurement that was measured at the transmitter during the second time and the second date;

using the third pressure measurement to determine a third reference pressure that corresponds to the reference altitude;

identifying a fourth pressure measurement that was measured at the reference sensor during the second time and the second date;

using the fourth pressure measurement to determine a fourth reference pressure that corresponds to the reference altitude;

determining another initial pressure adjustment by determining a difference between the third reference pressure and the fourth reference pressure; and determining the pressure adjustment using one or both of the initial pressure adjustment and the other initial pressure adjustment.

25. The one or more non-transitory machine-readable media of claim 24, wherein determining the pressure adjustment using one or both of the initial pressure adjustment and the other initial pressure adjustment comprises:

combining the initial pressure adjustment and the other initial pressure adjustment.

26. The one or more non-transitory machine-readable media of claim 24, wherein determining the pressure adjustment using one or both of the initial pressure adjustment and the other initial pressure adjustment comprises:

identifying a time segment during which the measured pressure was measured at the transmitter;

identifying a historical pressure adjustment that was determined at a previous time before the time segment during which the pressure is measured at the transmitter or during the time segment on a previous day, wherein the historical pressure adjustment is either the initial pressure adjustment or the other initial pressure adjustment; and using the historical pressure adjustment as the pressure adjustment.

27. The one or more non-transitory machine-readable media of claim 23, wherein using the pressure adjustment and the measured pressure to determine the reference pressure comprises:

determining an intermediate reference pressure using the measured pressure; and adjusting the intermediate reference pressure by the pressure adjustment to determine the reference pressure.

28. The one or more non-transitory machine-readable media of claim 16, wherein:

identifying an initial temperature measured at the transmitter comprises:
(i) measuring, at the transmitter, one or more temperatures at one or more different times within a first time segment,
(ii) identifying a minimum temperature from among the one or more temperatures, and
(iii) using the minimum temperature as the initial temperature; and identifying a temperature scaling factor and a temperature offset comprises:
(i) measuring a reference temperature at a reference sensor,
(ii) determining another temperature measured at the transmitter,
(iii) determining a first temperature scaling factor and a first temperature offset using the initial temperature, the reference temperature and the other temperature measured at the transmitter,
(iv) determining the temperature scaling factor using the first temperature scaling factor, and
(v) determining the temperature offset using the first temperature offset.

29. The one or more non-transitory machine-readable media of claim 16, wherein determining a reference pressure at the reference altitude using the adjusted temperature comprises:

determining a difference in altitude between the altitude of the transmitter and the reference altitude;

determining a third value by multiplying the difference in altitude, an acceleration due to gravity, and a molar mass of air;

determining a fourth value by multiplying a gas constant and the adjusted temperature;

determining a fifth value by dividing the third value by the fourth value; and determining the reference pressure by multiplying the measured pressure by an exponential function of the fifth value.

* * * * *